March 4, 1941.                F. C. WILSON                2,233,463
                                GAS GRILL
                          Filed March 30, 1939        2 Sheets-Sheet 2

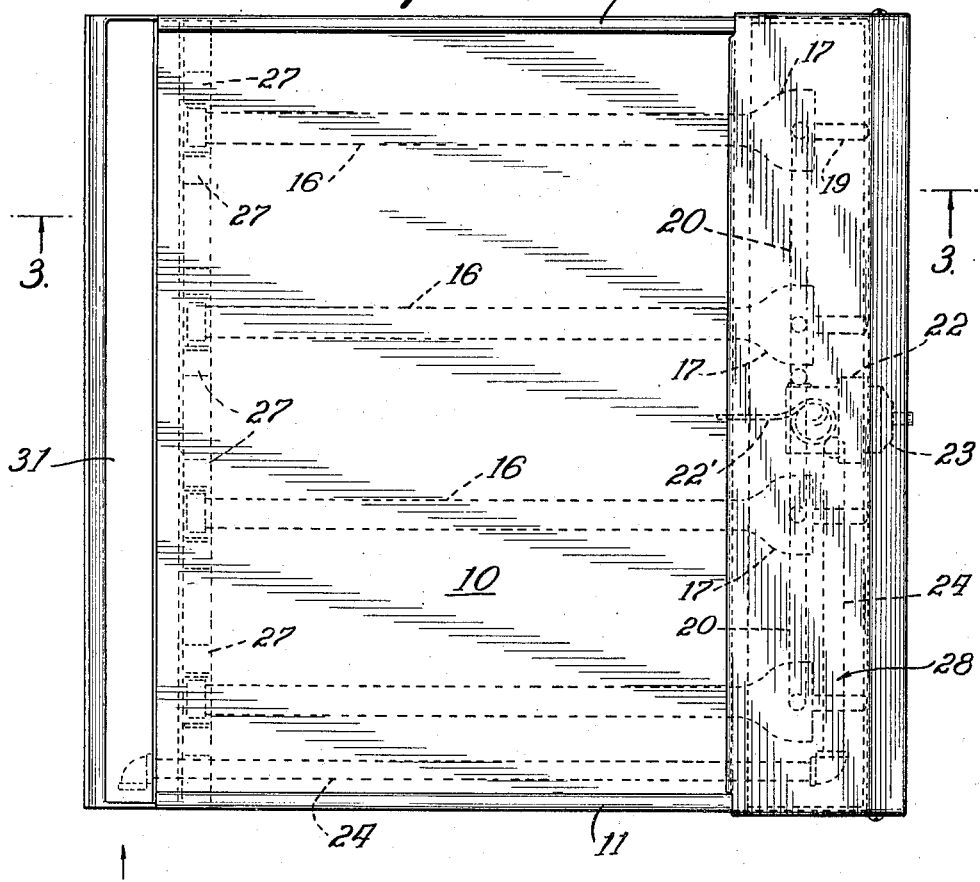
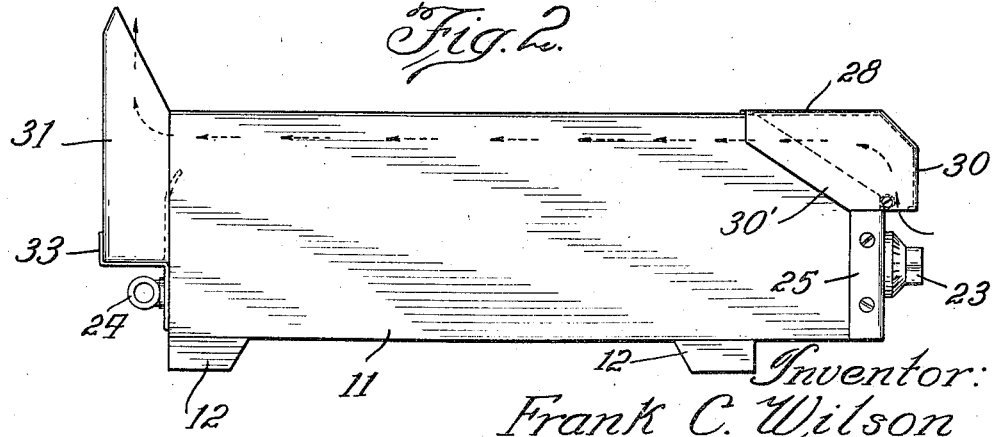

Inventor:
Frank C. Wilson
By: Tefft & Tefft
                Attys.

Patented Mar. 4, 1941

2,233,463

UNITED STATES PATENT OFFICE 2,233,463

GAS GRILL

Frank C. Wilson, Bloomington, Ill., assignor to Servrite Mfg. Co., Bloomington, Ill., a corporation of Illinois Application March 30, 1939, Serial No. 264,896

2 Claims. (Cl. 126—39)

This invention relates to gas heated grills and is a continuation in part of my co-pending applications Serial No. 97,112 filed August 21, 1936, now Patent No. 2,156,557, issued May 2, 1939, having reference to an electric grill, and Serial No. 262,643, filed March 18, 1939, now Patent No. 2,175,333, issued October 10, 1939 referring to a grease pan for grills.

The particular object of this invention is to provide a gas heated grill of attractive and efficient design that can be used in full view of the customers and wherein the flow of exhaust gases is controlled in a manner to insure the least discomfort to both operator and customer.

Other objects and benefits will be disclosed in the following descriptions and drawings in which:

Fig. 1 is a plan view of my grill with the burners, thermostat and service lines shown in dotted outline;

Fig. 2 is a side elevation view showing the front cover baffle and grease pan in their relation to the grill proper and the general flow of air through the grill by flow arrows;

Now referring to Figs. 1 and 2, I designate the grill plate proper by the numeral 10. This grill plate is supported in a frame 11 which in turn is supported on short legs 12. It will readily be appreciated that these short legs 12 raise the frame above the supporting table or counter and thus provide space for secondary air to the burners as will later be disclosed.

Figure 5:
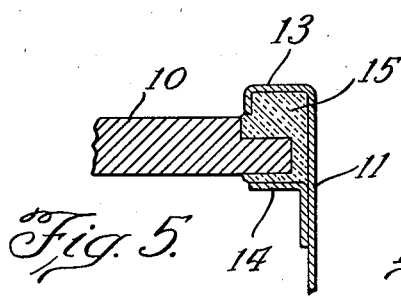
Fig. 5 is a cross-section detail of the grill plate support and insulation as it would appear on the section lines 5—5 of Fig. 3.

Now referring to Fig. 5, it will be noted that the frame 11 has an overturned top angle 13 and a supporting angle 14 attached thereto. In the space thus provided I provide insulating material 15 which supports the grill plate 10 away from metallic contact with the supporting frame and as the insulating material 15 is a non-conductor, the heat in the grill plate 10 is retained and is not readily transmitted to the frame part of the grill.

Figure 3:
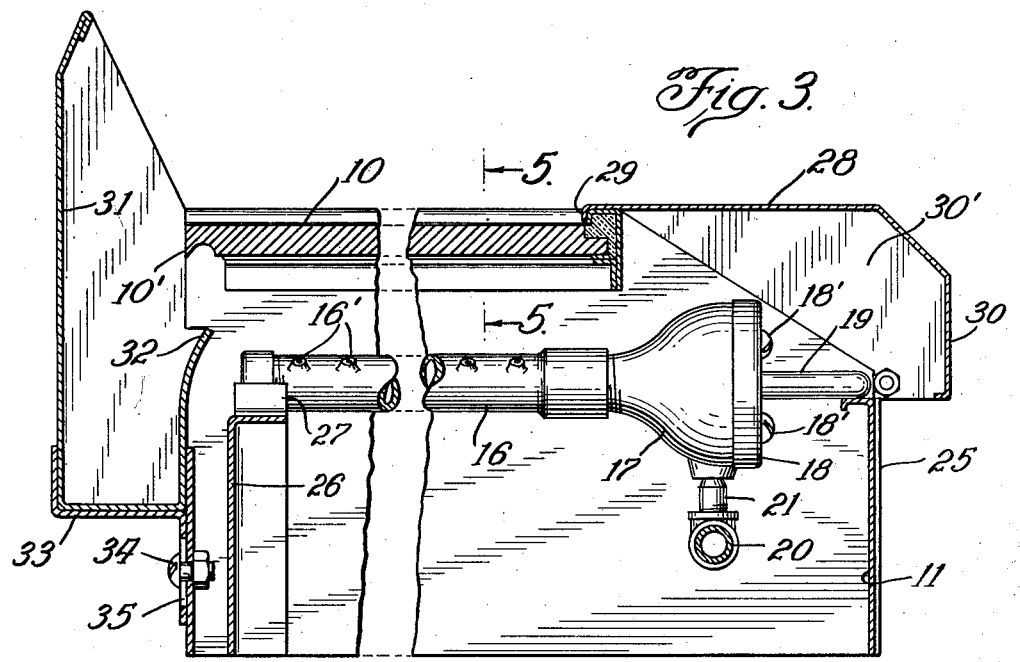
Fig. 3 is an enlarged broken sectional side elevation view showing details of structure to be described later.
Figure 4:
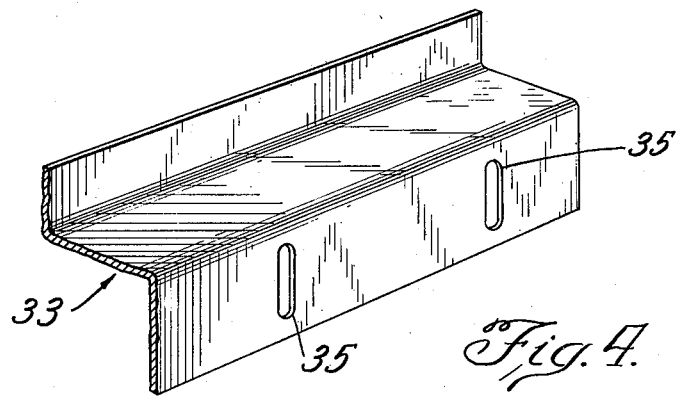
Fig. 4 is an isometric view of the adjustable grease pan support bracket, the purpose of which will later be disclosed.

Now referring to Fig. 3, I show a conventional burner member 16 having conventional burner tips 16' which are well understood in the art and will not be explained in detail. Attached to the burner 16 is a conventional Venturi valve 17 having an adjustable air inlet cap 18 and a gas adjustment valve 19. This is a conventional structure wherein the air may be adjusted by rotating the cap 18 and then clamped by the screws 18'. The Venturi valve is supported on a taper nipple 21 attached to a gas supply line 20 emerging from a conventional thermostat 22 which is controlled by the heat in the grill plate 20 acting on the fluid in the thermostat 22 through the tube 22' inserted in the grill plate 10. This method of controlling temperature is conventional and is well known in the art and inasmuch as it is not pertinent to the present invention will not be described in greater detail.

The inner end of the burners 16 are supported on a cross angle 26 and are held in spaced relationship by angles 27 as shown. By this structure it will be appreciated that the burners may be readily lifted out from under the grill by merely lifting them off of the nipple 21 and the supporting angles 26 and 27. Thus I provide means whereby the burners may be readily removed for cleaning or inspection and readily be replaced in accurate relationship to the grill.

By referring to Fig. 3 it will be noted that the grill plate 10 does not extend to the front of the grill proper but stops somewhat short of the front. This gap is closed and covered by the front cover baffle 28 which is effectively held in position by the angle 29 and supported by the baffle side 30' on the angle 25, as clearly shown. It will readily be appreciated that this front cover baffle can be readily lifted off to provide easy access to the burners.

It will also be carefully noted that the front edge 30 of the cover baffle 28 extends beyond the front of the frame 11 and thus provides an opening through which burner air is inducted for proper burner combustion. This incoming air is effective in keeping the cover baffle 28 cool, and the general flow of air from front to back of the grill is likewise effective in providing a flow of fresh air around the operator and away from the customers. This general flow of air is clearly shown by the flow arrows in Fig. 2.

The grease pan 31 extends completely across the back of the grill. This grease pan has an inturned lip 32 extending under the back edge 10' of the grill plate 10 which is effective in catching any drippings from the back edge of the grill plate. The edge 10' is formed in the grill plate by a groove, as clearly shown in Fig. 2.

The grease pan 31 is supported on a bracket 33 adjustably held by bolts 34 through slots 35 supported on the back frame 11. It will readily be appreciated that the bracket 33 can be vertically adjusted by means of the bolts 34 and slots 35. When such adjustments are made it will be appreciated that the lip 32 of the grease pan may be moved toward or away from the back lip 10', and inasmuch as this area controls the outward flow of the air, I thus provide means whereby the air flow may be adjusted to provide proper ventilation with the least loss of heat controlling as it does not only the flow of air under the front cover baffle 28, but also the secondary air under the bottom edge of the frame 11 as provided by the short legs 12. This damper control of air flow is very important in the proper operation of the grill and from the foregoing description it will be obvious that I have provided a simple and convenient means to adjust and control the flow of air.

Having thus described my invention, I claim:

1. In a gas heated grill, a frame, a grill plate supported by but insulated from said frame, gas heating means for said grill, a front opening between said plate and frame, a cover baffle plate for said opening, an air passage between said baffle plate and frame, a grease pan extending across the rear of said grill, an air passage between the grease pan and said grill plate, and adjustable means to raise or lower said grease pan whereby a flow of air for said heating means is provided from front to rear of said grill.

2. In a gas heated grill, a frame, a grill plate supported by but insulated from said frame, gas heating means for said grill, legs under said frame providing an air opening for secondary combustion air, a front opening between said plate and frame, a cover baffle plate for said opening, an air passage between said baffle plate and frame, a grease pan extending across the rear of said grill, an air passage between the grease pan and said grill plate, and adjustable means to raise or lower said grease pan whereby a flow of primary air for said heating means is provided, inducting a flow of air from front to rear of said grill.

FRANK C. WILSON.